(12) United States Patent
Hoagland

(10) Patent No.: US 6,382,485 B1
(45) Date of Patent: May 7, 2002

(54) UNIVERSAL IN-LINE SKATE CARRIER ATTACHMENT FOR BICYCLE RACKS

(76) Inventor: Steven Hoagland, 141 Clark St., Waltham, MA (US) 02453

( * ) Notice: Subject to any disclaimer, the term of this patent is extended or adjusted under 35 U.S.C. 154(b) by 0 days.

(21) Appl. No.: 09/804,018

(22) Filed: Mar. 12, 2001

(51) Int. Cl.[7] .............................................. B62J 11/00
(52) U.S. Cl. .................... 224/419; 224/454; 224/460; 224/571
(58) Field of Search ................. 224/571, 460, 224/412, 413, 419, 423, 427, 452, 454, 455; 211/19, 20

(56) References Cited

U.S. PATENT DOCUMENTS

| | | | | |
|---|---|---|---|---|
| 2,353,809 A | * | 7/1944 | Carson | 211/89.01 |
| 3,861,533 A | * | 1/1975 | Radek | 211/20 |
| 4,733,897 A | * | 3/1988 | Schuetzeberg | 211/34 |
| 5,167,170 A | * | 12/1992 | Croteau | 206/315.1 |
| 5,269,580 A | * | 12/1993 | Hsiao | 294/162 |
| 5,547,157 A | * | 8/1996 | Hsiao | 211/35 |
| 5,617,983 A | * | 4/1997 | Lindauer et al. | 206/315.1 |
| 5,678,742 A | * | 10/1997 | Lindauer | 224/422 |

* cited by examiner

Primary Examiner—Stephen P. Garbe
(74) Attorney, Agent, or Firm—Robert Nathans

(57) ABSTRACT

Each skate is strapped down upon a skate carrier, in turn mounted upon any pre-existing or conventional article carrying bicycle rack. Stop elements, along with the skate carrier strap, prevent escape of the skate from the carrier, particularly while a mountain bike is being driven over rough terrain. Vertical positioning of the stop elements, which can be threaded bolts, is adjustable to secure various skate wheel sizes of child and adult skates. Positioning of the threaded bolts is rapidly changed by loosening and tightening a wing nut on the bolt thread while a square bolt head portion within a square orifice prevents rotary slippage of the bolt, and thus no tools such as a wrench or screwdriver are needed. A cylindrical sleeve can surround the bolt, enabling the use of lighter skate carrier metal stock. A non-slip rubber mat can be placed between the skate carrier and the bike rack to prevent detrimental shifting of the skate carrier.

20 Claims, 2 Drawing Sheets

UNIVERSAL IN-LINE SKATE CARRIER ATTACHMENT FOR BICYCLE RACKS

BACKGROUND OF THE INVENTION

The present invention relates to the field of recreational skating.

In-line roller skating has become very popular in recent years along with ice skating and bicycle riding. It would be desirable to provide a simple and thus inexpensive, reliable and easy to use universal skate carrier attachment for carrying in-line roller skates on any conventional article carry bicycle rack, usually mounted over the rear bicycle wheel.

In Hsiao patent 5,269,580 a skate carrier not designed for a conventional bike rack is disclosed, having various spring biased clasps for holding the skate wheels down against a carrier so that they remain in place. Such spring biased clasps are relatively complex and may involve substantial undesired insertion and removal forces while inserting and removing the skates from the carrier. Also, Hsiao does not suggest mounting his carrier upon a bicycle. Even if this were attempted, his carrier would be unsuitable for use in connection with a pre-existing article carrying bicycle rack. This is because such use of his carrier could result in loss of the skates while biking over bumpy terrain and particularly where the skate carrier is mounted on the conventional rear bike rack, not observed by the rider looking forward while steering the bicycle. Should the spring biasing forces be reduced to ease manual forcing of the skates against the manual insertion and removal forces of the skates to and from the carrier, the skates could even more readily separate from the carrier, and be lost during riding the bike over such bumpy terrain.

U.S. Pat. No. 5,617,983 to Lindauer teaches an in-line skate carrier that can be strapped to a bicycle rack and has anti-roll wheel chocks that hinder forward or backward motion of the rollers. As they are not positioned over the rollers it appears that they would not prevent dislodging of the rollers from the carrier, should a mountain bike be driven over rough terrain. Also, Lindauer does not disclose accommodating various wheel sizes.

It is thus a goal of the present invention to provide an in-line skate carrier which can be easily mounted upon any conventional or pre-existing article carrying bike rack, and which ensures that the skates, regardless of variable wheel sizes, cannot "pop out" and become disloged and lost, particularly when the skates are being carried by a bike subjected to bumps, while being driven over a bumpy path which is commonplace for popular mountain bikes.

It is a further goal of the invention to provide a skate carrier that is relatively simple, and thus easier and cheaper to manufacture relative to more complex prior art designs, and which is reliable in use and can be mounted upon a pre-existing conventional bicycle rack.

BRIEF SUMMARY OF A PREFERRED EMBODIMENT OF THE INVENTION

The above mentioned goals are believed to be substantially met by a preferred embodiment of the invention whereby a flat plate carrier is strapped to virtually any conventional or pre-existing article carrying bicycle rack by a first and second strap having conventional buckles. The carrier plate has two wheel tracks for receiving and supporting the in-line wheels of the two skates. Each track has a front wheel stop mechanism comprising a threaded stop bolt which can be quickly and easily inserted through one hole pair of two or three pairs of holes, each hole pair having different vertical positions. The stop bolt in the lower position contacts a small diameter wheel for a child's skate, and if the stop bolt is in the upper position it contacts the larger diameter wheel of an adult's skate. An intermediate position can accommodate an intermediate wheel size. An upper conventional buckle and strap holds each skate in place in the wheel tracks. The upper strap is attached to one edge of the carrier plate and is drawn across the back wheel or skate heel of each skate, forcing the skates downwardly against the bicycle mounted carrier plate and at the same time forward into the aforesaid stop bolts. The bottom surface of the carrier plate can be covered with a non-slip rubber material to ensure a secure grip on the bike-mounted rack to prevent slipping. The stop bolts are positioned above the front skate wheels at a position to firmly block a popping out or escape of the skates from the skate carrier, regardless of skate wheel size or the bumpiness of a bike ride. This action could result in the loss of a skate, particularly from a mountain bike driven over very rough terrain.

BRIEF DESCRIPTION OF THE DRAWINGS

Other features and advantages of the present invention will become more apparent upon study of the following detailed description, taken in conjunction with the drawings in which.

DETAILED DESCRIPTION OF PREFERRED EMBODIMENTS OF THE INVENTION

Figure 1:
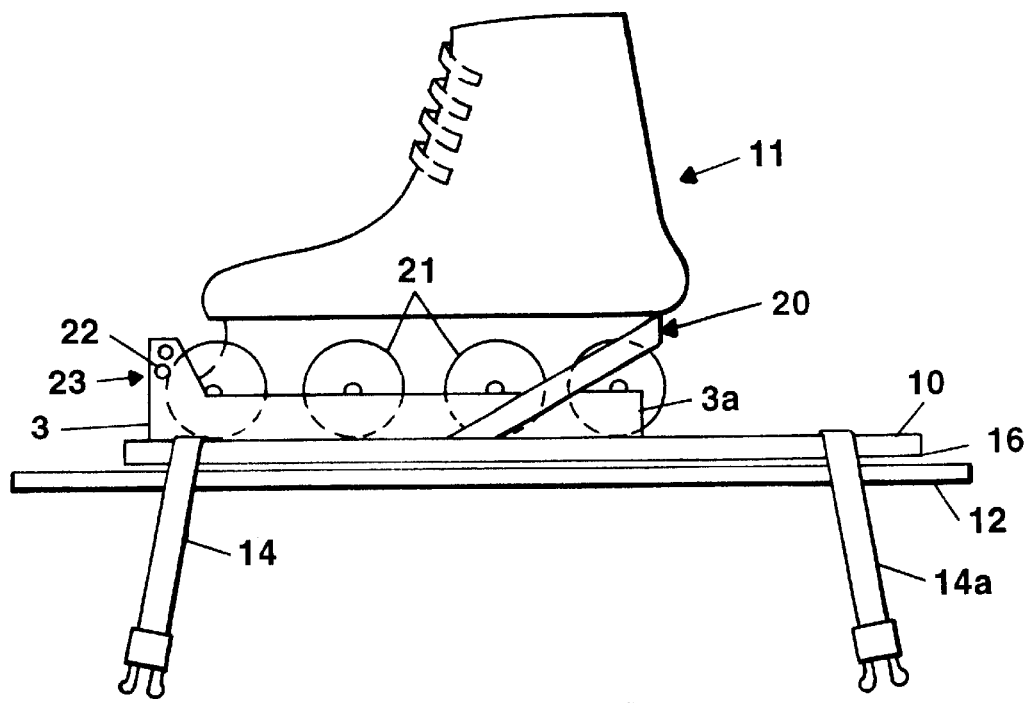
FIGS. 1 and 2 illustrate side and top views respectively of a preferred embodiment of the invention.
Figure 2:
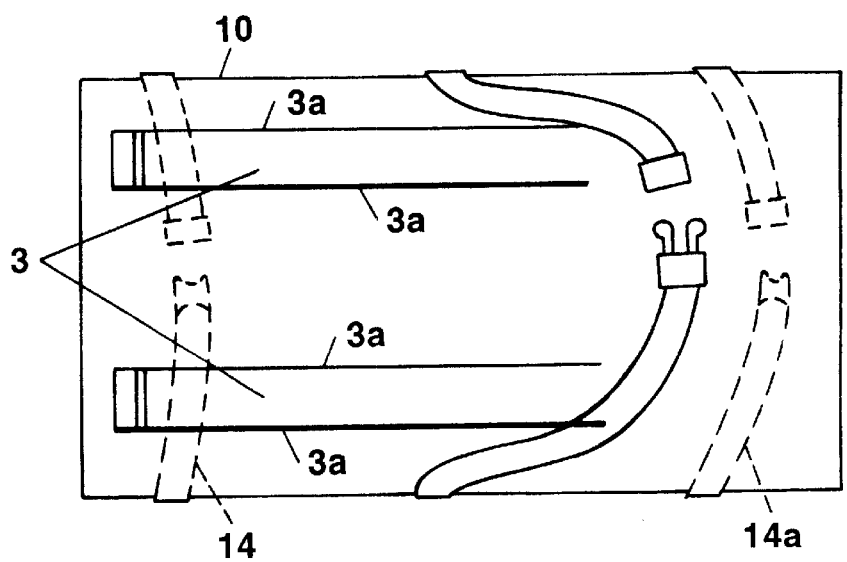
Figure 3:
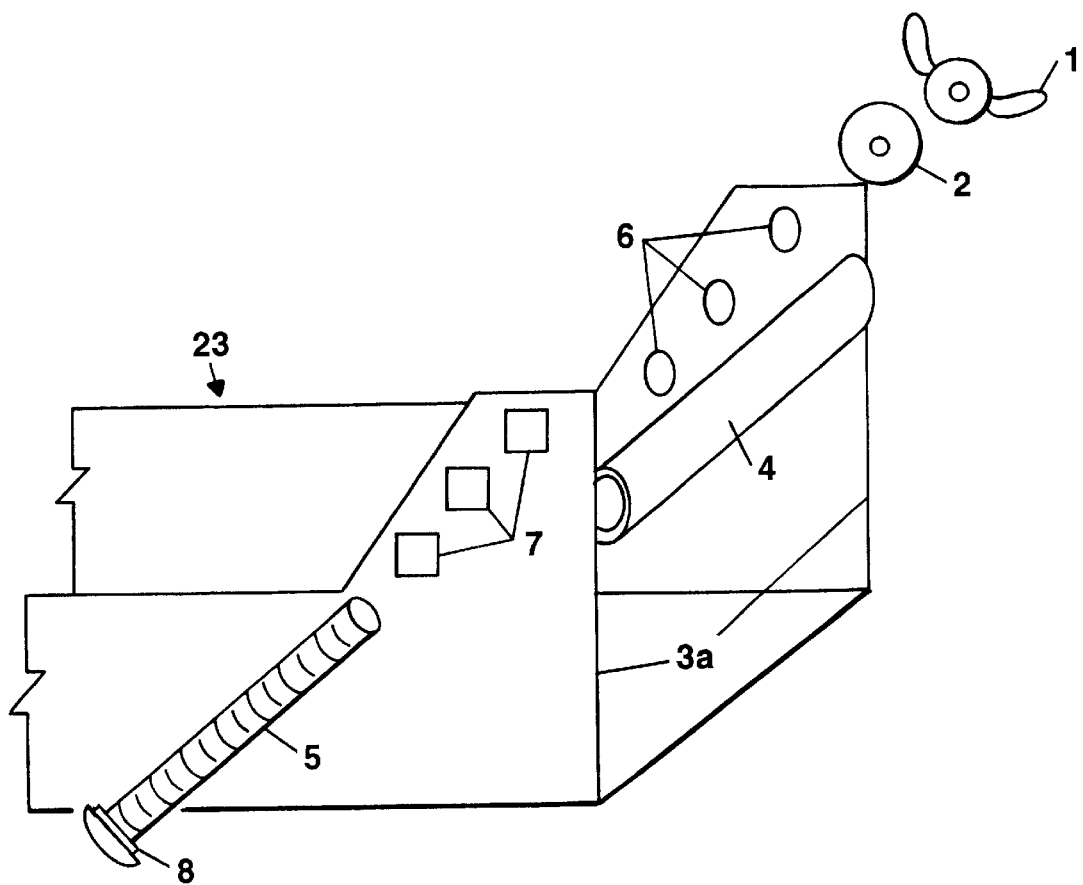
FIG. 3 illustrates an exploded view of details of the adjustable bolt wheel stop 22 shown in FIGS. 1 and 2.

As shown in FIGS. 1 and 2, skate carrier plate 10 is firmly mounted upon conventional bike rack 12, usually positioned over the rear wheel of the bicycle, by first and second lower buckled straps 14 and 14a comprising rack mounting means. A pair of wheel tracks 3 each comprise a pair of vertical side portions 3a that support the rollers 21 of the in-line skates 11 as shown in FIG. 1. Each skate 11 is held in place in its track by an upper buckled strap 20 that is attached to one edge of the carrier plate 10 and is drawn across the back wheel and/or the heel of each skate, forcing the skate forward into a stopping pin or bolt 22 of the variable positioning wheel stop assembly 23, one for each skate, shown in detail in FIG. 3. This upper strap 20 which is the skate mounting means is removably attached to a fastener on the far side of the carrier plate 10.

Figure 4:
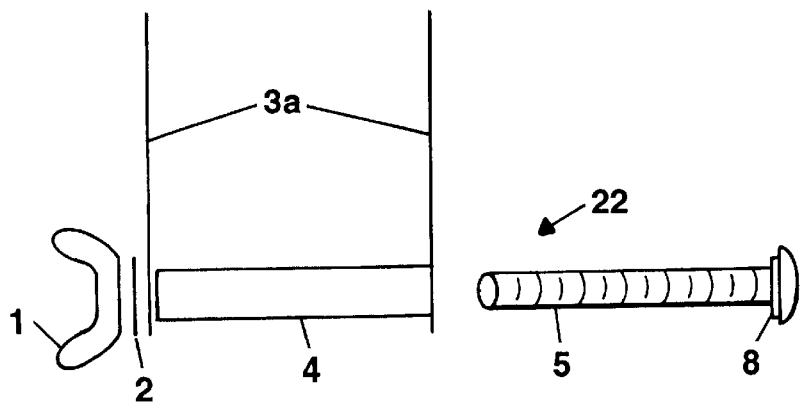
FIG. 4 illustrates an exploded view of a bolt and sleeve arrangement before insertion into the adjustable wheel stop of FIG. 3.

An exploded view of one adjustable wheel stop assembly 23 shows the aforesaid side track members 3a for supporting the skate wheels 21 and having vertically oriented round holes 6 and square holes 7 for receiving the stop pins or bolts 22 also shown in FIG. 4. Assume an adult skate with a large diameter wheel is to be mounted upon the carrier 10. Bolt 5 would be passed through upper square orifice 7a, through hollow cylindrical sleeve 4 and through upper round orifice 6. Washer 2 would receive the end of the bolt, and wing nut 1 would be tightened over the washer to firmly affix the stop bolt to the sides 3a of the height adjustable wheel stop mechanism 23. The square bolt end member 8 of bolt 5 would be positioned within the upper square orifice 7 aligned with the upper round orifice 6. This allows the square bolt shoulder 8 to "lock in" to the square orifice and thus the bolt will not rotate or spin when wing nut 1 is tightened. Beneficially, this makes changing vertical bolt positions easy for anyone, without the need for a tool. Sleeve 4 may optionally be used to prevent the track sides 3a from moving toward each other when tightening the bolt. Thus, use of the sleeve may permit thinner metal stock to be used for the side portions 19, to save manufacturing costs. Should a relatively small diameter wheel on a child's skate be mounted upon the carrier, the bolt would be removed by turning wing nut 1 to enable removal of the bolt from the upper orifices and be affixed to the lower orifices as described above. The remaining holes if present could be available for an intermediate wheel size. A non-slip rubber sheet 16 can be affixed to the underside of the carrier plate 10 as shown in FIG. 1 to ensure a firm grip of the skate carrier upon the bike rack and prevent sliding. The skilled worker in the art will visualize variations in the foregoing components, and thus the scope of the invention is to be restricted solely by the terms of the following claims and art recognized equivalents thereof. For example, the preferred buckled straps could be replaced by other types of skate mounting or skate position maintaining devices such as belts, elastomeric tie-cords or bungee chords terminating with hooks placed in holes in the track sides. The term "bicycle rack" is intended to include a motorcycle rack. Thus, the skate carrier plate may be mounted upon a motorcycle (a motorized bicycle) rack rather than a conventional bicycle rack. While the invention is primarily concerned with in-line roller skates, ice skates or the like may be placed within the aforesaid tracks. A filler material could be placed around each blade to "fatten" it so that it more closely fits within the channel. Thus the in-line skating members could comprise tandem portions of the ice skate blade. The term "non-slip mat" covers a mat having a high coefficient of friction such as rubber.

What is claimed is:

1. Apparatus for transporting in-line skates having in-line skating members, comprising:
   (a) a skate carrier having support means for supporting a pair of in-line skates thereon;
   (b) rack mounting means for mounting said skate carrier upon a pre-existing article carrying bicycle rack;
   (c) stop element positioning means for selectively positioning stop elements in one of a plurality of vertically variable positions over upper portions of skating members of said in-line skates for accommodating various sizes of said skating members; and
   (d) skate mounting means for mounting said in-line skates upon said skate carrier at a position thereon that urges a forward skating member against a stop element.

2. Apparatus as set forth in claim 1 wherein said stop element comprises a pin element fastened upon said skate carrier.

3. The apparatus of claim 2 wherein said pin element comprises a threaded bolt.

4. The apparatus of claim 3 wherein said threaded bolt has a threaded portion for receiving a wing nut for rapidly coupling and uncoupling said pin element to and from said skate carrier.

5. The apparatus of claim 4 wherein said threaded bolt has a square head portion positioned within a square orifice within said skate carrier for preventing rotation of said threaded bolt during tightening of said wing nut.

6. Apparatus of claim 2 wherein a cylindrical sleeve surrounds said pin element.

7. Apparatus of claim 3 wherein a cylindrical sleeve surrounds said threaded bolt.

8. Apparatus of claim 4 wherein a cylindrical sleeve surrounds said threaded bolt.

9. Apparatus of claim 5 wherein a cylindrical sleeve surrounds said threaded bolt.

10. Apparatus of claim 1 including a non-slip mat positioned between said skate carrier and said bicycle rack.

11. Apparatus of claim 4 including a non-slip mat positioned between said skate carrier and said bicycle rack.

12. Apparatus for transporting in-line skates having in-line skating members, comprising:
    (a) a skate carrier having support means for supporting a pair of in-line skates thereon;
    (b) rack mounting means for mounting said skate carrier upon a pre-existing article carrying bicycle rack;
    (c) a stop element positioned over an upper portion of a forward skating member of each in-line skate for preventing vertical displacement and potential dislodging of each in-line skate from said skate carrier; and
    (d) skate mounting means for mounting said in-line skates upon said skate carrier at a position thereon that urges a forward skating member against said stop element.

13. The apparatus of claim 12 wherein said stop element comprises a threaded bolt.

14. The apparatus of claim 13 wherein said threaded bolt has a threaded portion for receiving a wing nut for rapidly coupling and uncoupling said threaded bolt to and from said skate carrier.

15. The threaded bolt of claim 14 wherein said threaded bolt has a square head portion positioned within a square orifice within said skate carrier for preventing rotation of said threaded bolt during tightening of said wing nut.

16. Apparatus of claim 13 wherein a cylindrical sleeve surrounds said threaded bolt.

17. Apparatus of claim 14 wherein a cylindrical sleeve surrounds said threaded bolt.

18. Apparatus of claim 15 wherein a cylindrical sleeve surrounds said threaded bolt.

19. Apparatus of claim 12 including a non-slip mat positioned between said skate carrier and said pre-existing article carrying bicycle rack.

20. Apparatus of claim 15 including a non-slip mat positioned between said skate carrier and said pre-existing article carrying bicycle rack.

* * * * *